United States Patent [19]

Hirosawa et al.

[11] Patent Number: 4,814,975
[45] Date of Patent: Mar. 21, 1989

[54] VIRTUAL MACHINE SYSTEM AND METHOD FOR CONTROLLING MACHINES OF DIFFERENT ARCHITECTURES

[75] Inventors: Toshio Hirosawa, Machida; Masaru Ohki, Kodaira, both of Japan

[73] Assignee: Hitachi, Ltd., Tokyo, Japan

[21] Appl. No.: 638,270

[22] Filed: Aug. 6, 1984

[30] Foreign Application Priority Data

Sep. 8, 1983 [JP] Japan ............................ 58-165995

[51] Int. Cl.⁴ .............................................. G06F 9/44
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,094,610 | 6/1963 | Humphrey, Jr. et al. | 364/200 |
| 3,969,722 | 7/1976 | Danco et al. | 364/200 |
| 4,096,568 | 6/1978 | Bennett et al. | 364/200 |
| 4,179,735 | 12/1979 | Lodi | 364/200 |
| 4,253,145 | 2/1981 | Goldberg | 364/200 |
| 4,315,321 | 2/1982 | Parks, III et al. | 364/900 |
| 4,456,954 | 6/1984 | Bullions, III et al. | 364/200 |

OTHER PUBLICATIONS

Bagley, J. D., "Microprogrammable Virtual Machines", Computer, vol. 9, No. 2, Feb. 1976, pp. 38–42.
Wessberger et al, "User Microprogram Development for an LSI Processor", Proceedings of the Sixth International Congress on Microelectronics, Munich, Nov. 1974, pp. 1–5.
Nanba et al., "VM/4:ACOS-4 Virtual Machine System", N.E.C. Research and Development, No. 73, Apr. 1984, pp. 76–83.
Hamacher et al., "Computer Organization", McGraw Hill Book Company, 1978, pp. 124–146.
Lorin, Harold et al., "Operating Systems", Addison-Wesley Pub. Co., pp. 1–27.

Primary Examiner—Gareth D. Shaw
Assistant Examiner—Jonathan C. Fairbanks
Attorney, Agent, or Firm—Antonelli, Terry & Wands

[57] ABSTRACT

In a virtual machine system having a bare machine including an execution control unit, a storage control unit and a main storage unit and having a hardware architecture of its own, for supporting at least one virtual machine which runs on the bare machine and has a different hardware architecture than the bare machine, microinstructions for executing the instructions of the virtual machine are stored in storage means, and, in dispatching, the microinstructions in the microprogram associated with the virtual machine selected to be run on the bare machine are sequentially fetched from the storage means and executed by the execution control unit.

1 Claim, 8 Drawing Sheets

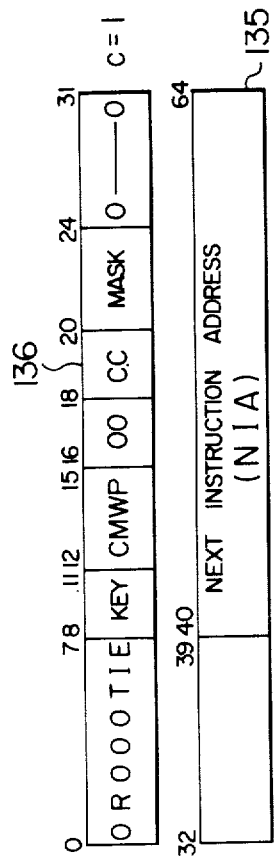
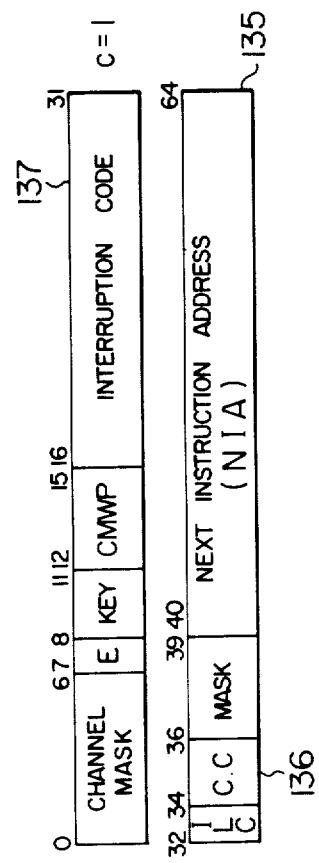
FIG. 4a
FIG. 4b

DISPATCHING

VIRTUAL MACHINE SYSTEM AND METHOD FOR CONTROLLING MACHINES OF DIFFERENT ARCHITECTURES

BACKGROUND OF THE INVENTION

The present invention relates to a virtual machine system controller, and more particularly to a virtual machine system controller which allows an operation of a virtual machine having a different architecture than that of a base machine.

A virtual machine system is disclosed in Japanese Patent Application Laid-Open No. 57-212680 which was filed claiming a priority of June 15, 1981 based on U.S. patent application Ser. No. 273,532, now U.S. Pat. No. 4,456,954.

As the field of application of digital computers has expanded, an addressing system which has fever restrictions on the capacity of a real memory, that is, a virtual storage system has been used. As an extension of the virtual storage system, a system which allows simultaneous use of one bare machine by a number of users, that is, a virtual machine system has been used. In the virtual machine system, a number of operating systems (OS's) apparently simultaneously run on one bare machine (BM) so that all resources including a main memory and input/output devices as well as a central processing unit are shared by the users.

In the BM, two operation modes, a privileged mode and a non-privileged mode are used. In a non-virtual machine, the privileged mode is assigned to the operation mode of the OS but the privileged mode in the virtual machine system (VMS) is assigned to an operation mode of a special control program and the OS is operated in the non-privileged mode. This special control program is referred to as a virtual machine monitor (VMM) or a virtual machine control program (VMCP).

FIG. 1 is a conceptual view of an ordinary VMS. A BM 501 provides to a software with a base machine interface 503 which can handle a privileged or non-privileged mode execution request. Accordingly, a VMM 502 operates by utilizing the base machine interface 503 provided by the BM 501. The VMM 502 provides additional virtual machine interfaces 508 and 508' to enable operations of OS's 506 and 507 which are operated in respective virtual machines (VM's) 504 and 505. While only two VM's are shown in FIG. 1, it should be understood that a larger number of VM's are usually included.

The OS's 506 and 507 are operated using the virtual machine interfaces 508 and 508' provided by the VM's 504 and 505, but when looked at from the user programs, it appears as if they operate on the BM 501.

The OS's 506 and 507 further provide extended machine interfaces 513 and 514 to user programs (UP's) 515-518. Extended machines (EM's) 509-512 have functions to execute supervisor call interuption from the user programs under certain function requests such as under certain OS, in the OS's 506 and 507 and functions to execute machine instructions in the non-privileged mode. Accordingly, if the OS 506 and the OS 507 are different from each other, the EM 509 and the EM 511 executed for different OS's 506 and 507 naturally have different functions.

In the virtual machine system (VMS) having the operation concept described above, a plurality of different OS's apparently may be simultaneously run on the BM. Accordingly, the following advantages are offered. (i) Debugging or testing of a newly developed system is attained without stopping the service to a running system. (ii) Since the plurality of different OS's can run on one BM, the cost of the real hardware is reduced and the utilization efficiency of hardware resources is improved.

In the VMS concept shown in FIG. 1, since the virtual machine interface 508 provided by the VMM 502 is functionally homogeneous to the base machine interface 503 provided by the BM 501, the OS which runs on the BM 501 can also run on the VM 504 and the VM 505. Accordingly, the VM is basically equivalent to the BM and has no functionally distinguishable difference. The VMM 502 does not interpret or execute the programs of the OS or the UP instruction by instruction but allows direct execution of the non-privileged instruction in the program by the BM 501. However, the VMM 502 detects the privileged instruction, and interpretes and executes, that is, simulates the detected instruction to assume the entire integrity of the system content without destroying the hardware environment of the VMS. After the interpretation and the execution, the VMM 502 returns the control to the program being executed. Thus, the non-privileged instruction is directly executed without the intervention of the VMM 502 and only the privileged instruction which requires the interpretation and the execution by the VMM 502 is intervened by the VMM 502.

A method in which the VMM 502 provides the service of the BM 501 to the VM's 504 and 505, that is, a dispatching method is similar to that in a conventional multiprogram control system. That is, the hardware resources of the BM 501 are allotted to the VM's in a time-division and space-division fashion. The VMM 502 manages the hardware resources of the BM 501.

FIG. 2 illustrates a space-division management method for a main memory of the VMS. The VMM 502 manages the hardware resources including the main memory and the input/output devices in a space-division fashion and manages a control register (CR) 521, a general register (GR) 522, a floating point register (FPR) 523, a program status word (PSW) 524 and a timer 525 in a time-division fashion as the machine instructions are executed. That is, when the VM is serviced by the BM 501, those elements are transferred to the real hardware in a time-division fashion.

As shown in FIG. 2, control blocks 527 for the respective VM's are formed in a main memory 526, that is, a first level storage 526. Contents of a virtual control register (VCR) 528, a virtual general register (VGR), a virtual floating point register (VFPR) 529, a virtual program status word (VPSW) 530, and a virtual timer 540 in the control block 527 are transferred to the CR 521, GR 522, the FPR 523, the PSW 524 and the timer 525 which are the real hardware resources, when the associated VM is serviced by the BM 501.

As is well known, a preparation job for the VMM 502 to service the VM 504 by the BM 501 is called a dispatching process. One of the VM's is selected by the dispatching process so that an operation environment is established.

On the other hand, the space-division management of the main memory is done by a well-known virtual storage control system. The VMM 502 provides virtual main memory spaces 531, that is, second-level storages, one for each VM. Thus, the VMM 502 provides virtualized second level storages. The second-level storages 531 are managed by space translation tables (which are also called mapping tables or address translation tables), that is, real segment tables (RST) 532 and real page tables (RPT) 533. When the OS 506 which runs on the VM 504 uses the virtual storage system, the OS 506 forms a virtual segment table (VST) 534 and a virtual page table (VPT) 535 in the second-level storage 531. Accordingly, the user program operates in a third-level storage 536 under the control of the VST 534 and the VPT 535. The VMM 502 directly manages the storage 526 by using the RST 532 and the RPT 533. The space translation from the third-level storage 536 to the first-level storage 526 requires two translations, one by the VST 534 and the VPT 535 and the other by the RST 532 and the RPT 533. As taught by the above-mentioned Japanese Patent Application, the translations can be done in one step by merging the RST 532 and the RPT 533, and the VST 534 and the VPT 535, respectively, so that the VMM 502 forms a shadow segment table (SST) 537 and a shadow page table (SPT) 538.

To manage the input/output devices, tables for device address versus real device addresses are provided one for each VM and managed in the space-division fashion.

The prior art virtual machine system is configured as shown in FIG. 2. As is apparent from the above description, in the VMS in which the virtual hardware provided by the VM 504 generated under the VMM 502 is homogeneous to the hardware of the BM 501, the above advantages, that is, the debugging which is in parallel with the service and the execution of the plurality of OS's are offered, but different types of hardwares between the VM's are not attained. Referring to FIG. 1, the VMM 502 cannot provide different virtual machine interfaces to the VM 504 and the VM 505. The virtual machine interface of the VM 504 is limited to that which is homogeneous to the base machine interface of the BM 501, and the virtual machine interface of the VM 505 is limited to that which is homogeneous to the base machine interface of the BM 501. Thus, the VM 504 and the VM 505 cannot have the virtual machine interface which is totally or partially non-homogeneous to the base machine interface of the BM 501. Thus, the prior art VMS cannot execute the OS which runs on a machine which is non-homogeneous to the BM.

Various improvements of the VMS have been proposed in the past, however, such improvements were directed to improve the run performance of the machine which is homogeneous to the BM. (See for example, Japanese Patent Application Laid-Open Nos. 55-42326, 55-113182 and 57-212680).

However, as the VMS has been used in various fields, the demand increases to run a program or an OS of a minicomputer or a microcomputer having different privileged instruction and PSW format than those of a large scale computer, in one VMS.

SUMMARY OF THE INVENTION

It is an object of the present invention to provide a virtual machine system controller which can effectively operate a virtual machine having a different hardware architecture than that of a bare machine of a virtual machine system.

It is another object of the present invention to provide a virtual machine system controller which assures a comparable performance of a virtual machine having a hardware which is non-homogeneous to a hardware of a bare machine, to a performance of the bare machine when the virtual machine is operated.

It is other object of the present invention to provide a virtual machine system controller which can effect dispatching control such that no discrepancy occurs in the runs of virtual machines when the virtual machines in a virtual machine system have different virtual machine interfaces.

In order to achieve the above objects, in accordance with one embodiment of the present virtual machine system controller, it comprises a bare machine having an execution control unit, a storage control unit, a main storage unit and input/output devices, and a control storage for storing microprograms including a microprogram for executing instructions of a machine having a different hardware architecture than that of the bare machine.

The control storage may include means for sequentially writing and reading the microprograms including the program for operating the machine having the different hardware architecture than that of the bare machine, to and from areas selected by an external program.

A plurality of storage areas for the microprograms are provided and the microprogram for operating the VM having the different hardware architecture than that of the BM is stored in the storage area, and the microprogram is selected based on information which discriminates the running VM so that the VM having the different hardware architecture than that of the BM can be effectively operated.

BRIEF DESCRIPTION OF THE DRAWINGS

The present invention will be apparent from the following detailed description taken in conjunction with the accompanying drawings, in which:

FIGS. 4a and 4b a format of a program status word (PSW) of a bare machine;

DESCRIPTION OF THE PREFERRED EMBODIMENT

Figure 3:
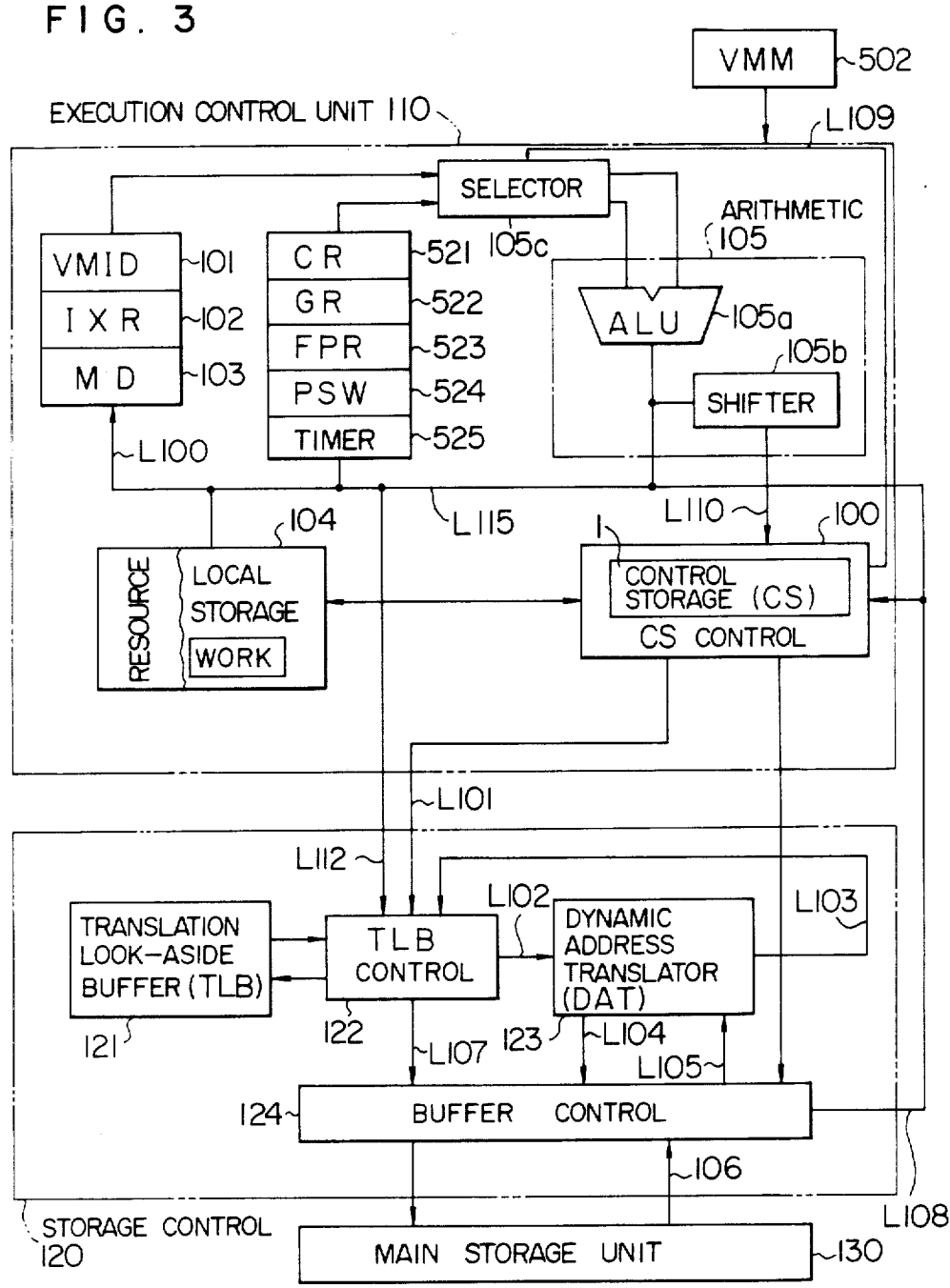
FIG. 3 is a block diagram of a computer system in accordance with one embodiment of the present invention.

FIG. 3 shows a block diagram of a computer system in accordance with one embodiment of the present invention. In FIG. 3, only a central processing unit and a main storage unit 130 are shown and other units are omitted. Connections to input/output devices are also omitted. The central processing unit comprises an execution control unit 110 and a storage control unit 120 to which the main storage unit 130 is connected.

Figure 2:
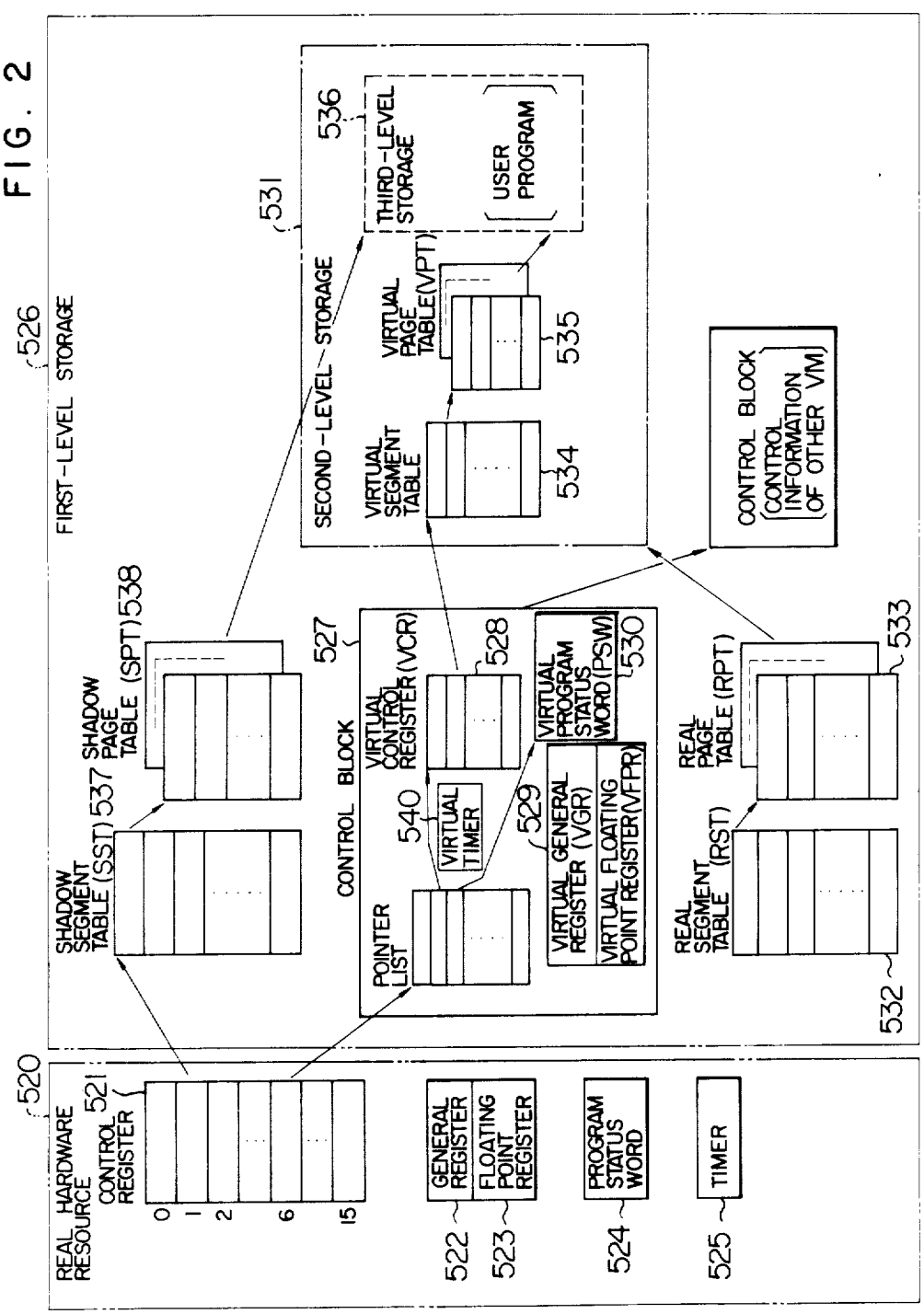
FIG. 2 illustrates a method of space-division management of a main storage unit in a virtual machine system in which a VM controller of the present invention is attained.

The execution control unit 110 includes a control storage (CS) control circuit 100 for controlling a control storage 1 (FIG. 7) in which microprograms for controlling hardware are stored, a virtual machine identification register (VMID) 101 for identifying a running VM from VM's 504 and 505 in the VMS, an index register (IXR) for locating the content of the CS 1 in the CS control circuit 100, a mode indicator (MD) 103 for indicating an operation mode of the running VM, a local storage (LS) 104 for creating a resource having a different hardware architecture than that of the bare machine such as an accumulator, a status register or a condition code latch, an arithmetic logic unit (ALU) 105 including an ALU 105a and a shifter 105b and a selector 105c for selecting inputs to either input of the ALU. The storage control unit 120 includes a translation look-aside buffer (TLB) 121 which stores pairs of logical addresses and physical addresses, a TLB controller 122 for controlling the TLB 121, a dynamic address translator (DAT) 123 for calculating a physical address by using the address translation tables 532 and 533, or 537 and 538 shown in FIG. 2 when the physical address corresponding to the logical address does not exist in the TLB 121, and a buffer controller 124 for storing high speed read/write data of the data stored in the main storage unit 130. The buffer controller 124 stores the data which is frequently used in the main storage unit 130, and includes a buffer storage (not shown).

Figure 1:
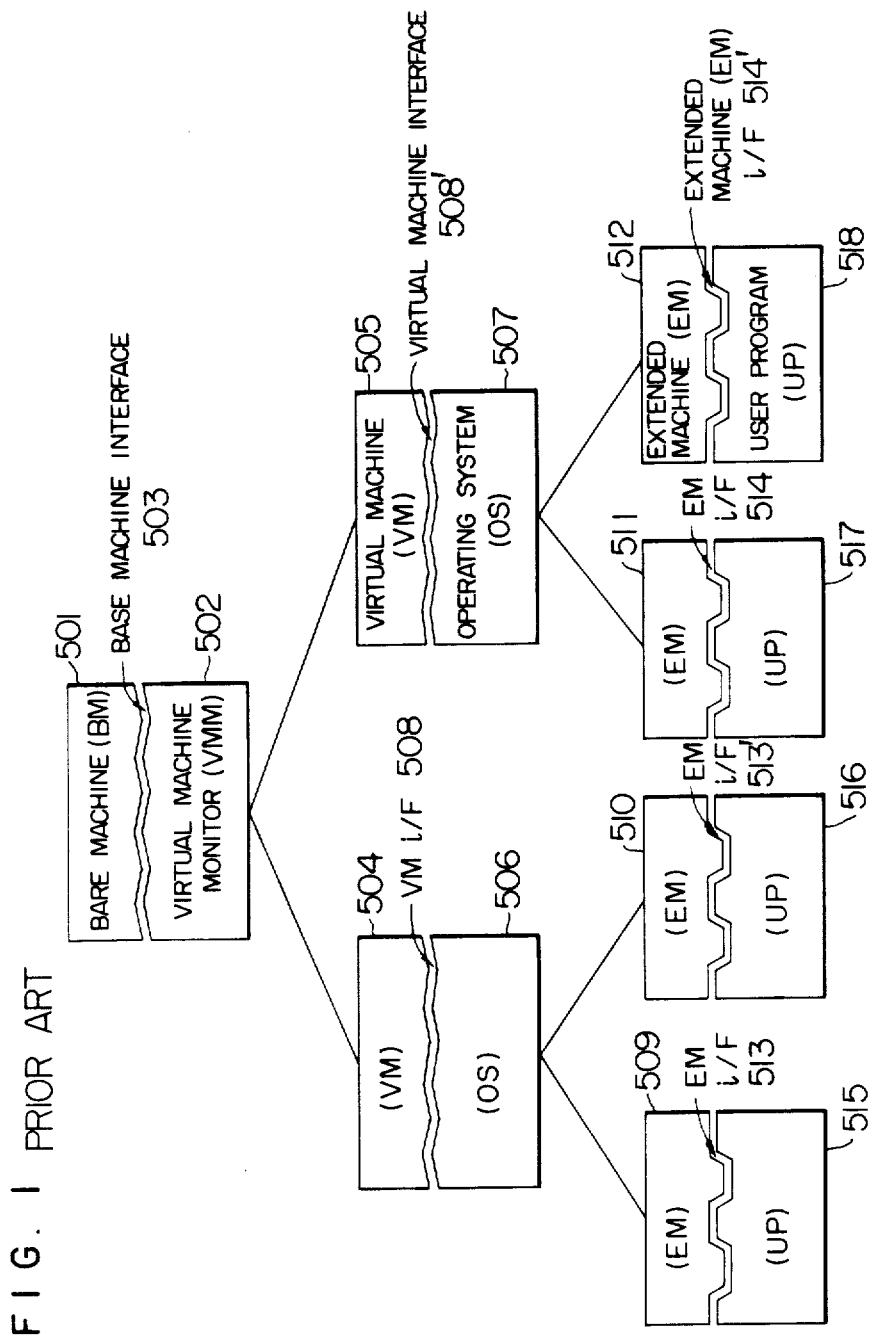
FIG. 1 illustrates a concept of a prior art virtual machine system.

An operation in a bare machine mode, that is, when the BM 501 shown in FIG. 1 does not operate in the VM mode is first explained. The content of the mode indicator 103 is "0 and the VMID register 101 and the index register 102 have no meaning.

The output of the mode indicator 103 is supplied to the CS control circuit 100 through a signal line L100. The CS control circuit 100 identifies the BM mode operation by the output signal of the mode indicator 103 and locates a CS area at which the corresponding microprogram is stored. The microprogram at the CS area sends an address of a microprogram instruction to the TLB controller 122 in the storage control unit 120 through a signal line L101 to read out the instruction from the main storage unit 130. The TLB controller 122 references the TLB 121 by the address supplied thereto. In the TLB 121, the physical addresses in the main storage unit 130 corresponding to the logical addresses are stored, but if the physical address corresponding to the logical address has not been assigned, it has not been registered in the TLB 121 and hence it cannot be referenced.

If the corresponding physical address has not been registered in the TLB 121, the address is sent to the DAT 123 through a signal line L102 to start the address translation to the physical address. It is effected by using the address translation tables, that is, the real segment table 532 and the real page table 533 shown in FIG. 2. When the DAT 123 completes the address translation, the logical address and the physical address are sent to the TLB controller 122 through a signal line L103 and written into the TLB 121. When the DAT 123 translates the address, it exchanges the data with the buffer controller 124 through signal lines L104 and L105 to access the address translation tables 532 and 533 shown in FIG. 2. More specifically, when the DAT 123 sends out to the buffer controller 124 the memory address in the main storage unit 130 to the signal line L104, it refers a buffer address array (not shown) in the controller 124 to check if the data exists in the buffer storage (not shown) in the controller 124, and if it exists, reads out the data and sends it back to the DAT 123 through the signal line L 105. If the data does not exist in the buffer storage, the data is read out from the main storage unit 130 through a signal line L106.

The TLB controller 122 sends the physical address of the instruction to the buffer controller 124 through a signal line L107. The data at the physical address is read out in the manner described above and the data is sent to the CS control circuit 100 through a signal line L108.

The microprogram in the CS control circuit 100 calculates an address in an operand field of the instruction and requests the data at the physical address corresponding to the operand address to the storage control unit 120. As the operand data is sent back through the signal line L108, the CS control circuit 100 sends the data together with an operation code of the instruction to the ALU 105 through a signal line L109.

The ALU 105 performs an operation in accordance with the operation code such as addition, subtraction or storing of data. It uses a work area in the local storage 104, as required. A result of the operation is reported to the CS control circuit 100 through a signal line L110, and the microprogram in the CS control circuit 100 sets the operation result into the PSW 524 and sets a next instruction address (NIA), and then calculates an address of the instruction to be executed next to prepare for the execution of the next instruction in the microprggram. The ALU 105 also requests to store the data through the signal line L115 in the main storage unit 130 through the buffer 124 or translate the logical address to the physical address through a signal line L112.

The operation in the bare machine mode has thus been described. It is same as the operation in the conventional VMS shown in FIG. 1 in which the hardware architectures of the VM 504 and the VM 505 are homogeneous to that of the BM 501.

The VMS in the present embodiment is characterized by the control method of the CS control circuit 100 in the VM mode where the hardware architectures of the VM 504 and the VM 505 are non-homogeneous to that of the BM 501, the VMID register 101 for identifying the running VM and the mode indicator 103 for indicating the operation mode.

Before the construction and the control method of the CS control circuit 100 are explained, an example in which the hardware architectures of the VM 504 and the VM 505 are non-homogeneous to that of the BM 501 is explained.

FIG. 4a shows a PSW format when the BM 501 is in an extended control mode (EC mode) and FIG. 4b shows a PSW format when the BM 501 is in a basic control mode (BC mode). (These PSW formats are adopted in the HITAC M-180, M-200H and M280 (M-Series) computers.)

Figure 5:
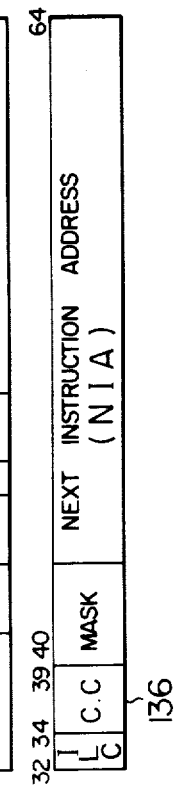
FIG. 5 shows a format of a PSW of a machine having a different hardware architecture than that of the bare machine.

A PSW format adopted in the HITAC E-800 (E-Series) computer is shown in FIG. 5. It is similar to the format of the basic mode in FIG. 4b but partially differs therefrom. It accompanies an operation in the virtual storage control system. An instruction format in the E-800 computer is identical to that of the M-Series computers except for a special privileged instruction.

Figure 6:
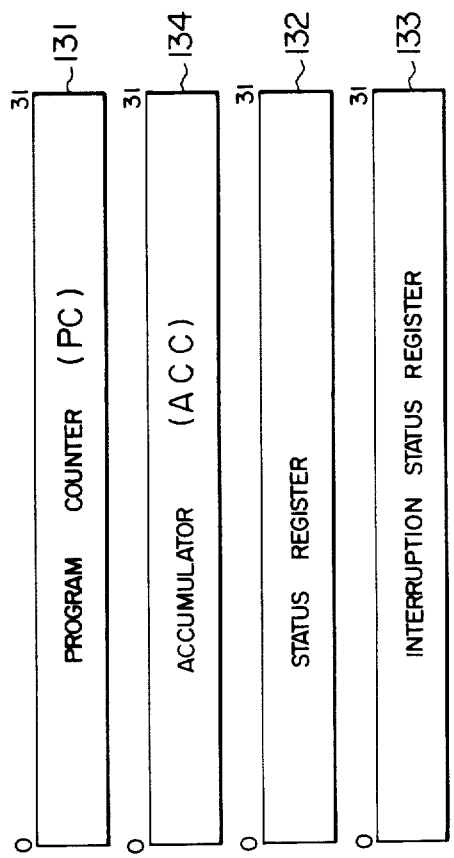
FIG. 6 shows a hardware information for a microcomputer.

FIG. 6 shows control registers in a further hardware or microcomputer. They correspond to the PSW and include a program counter 131, a status register 132, an interrupt status register 133 and accumulator 134. The accumulator 134 may be included in the ALU 105 shown in FIG. 3.

The program counter 131 in FIG. 6 corresponds to the next instruction address (NIA) 135 in FIG. 5 and the status register 132 corresponds to a condition code (CC) in FIGS. 4 and 5 and a specified address (not shown) of a prefixed storage area (PSA) in the main storage unit 130. The interruption status register 133 corresponds to an interruption code 137 in FIGS. 4 and 5. In the EC mode of FIG. 4a, the interruption code is generated at the specified address of the PSA in the main storage unit 130.

When the BM 501 shown in FIG. 1 has the hardware architecture of FIGS. 4a and 4b, that is, the hardware architecture of the M-Series machine and the VM 504 or the VM 505 is to be operated as the E Series machine of FIG. 5 or the microcomputer having the hardware architecture shown in FIG. 6, the operation can not be attained by the prior art VMS.

In accordance with the VMS of the present embodiment, the machine having non-homogeneous hardware architecture to that of the BM 501 can be operated under the VM 504 or the VM 505 by incorporating a special control circuit in the CS control circuit 100 as shown in FIG. 3. Various control registers are added to assume smooth operations.

Figure 7:
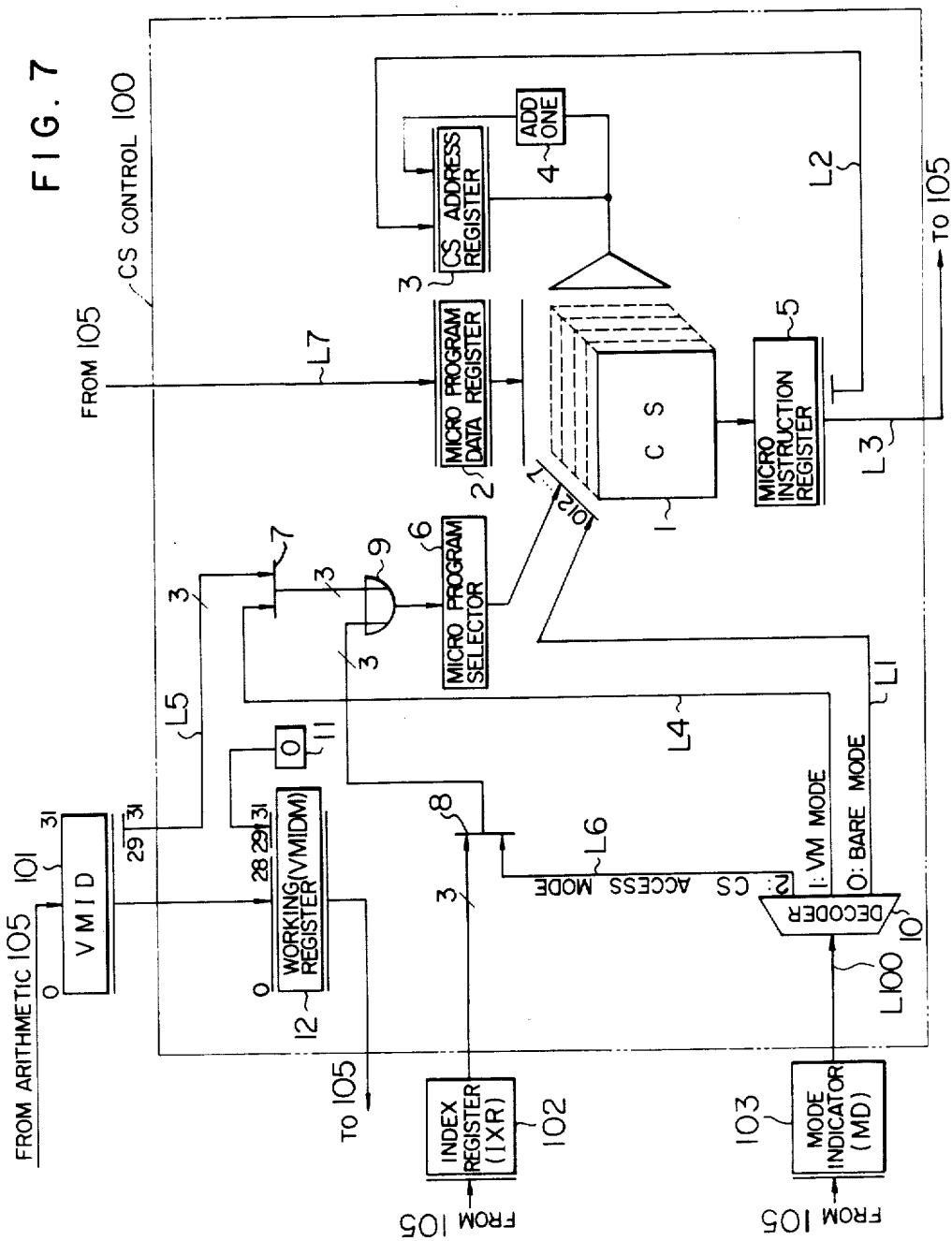
FIG. 7 is a block diagram of a CS control circuit in accordance with one embodiment of the present invention.

FIG. 7 shows a configuration of one embodiment of the CS control circuit. It shows an internal configuration of the CS control circuit 100 connected to the VMID register 101, the index register 102 and the mode indicator 103.

In FIG. 7, the control storage (CS) which stores the microprograms is of multi-construction so that a plurality of types of microprograms are stored therein. In FIG. 7, eight different types of microprograms Nos. 0-7 are stored although the number can be readily expanded. Numeral 2 denotes a microprogram data register (CREGIN) used to store the microprogram in the CS 1, numeral 3 denotes an address register (CSAR) for addressing the CS 1, numeral 4 denotes an increment circuit, numeral 5 denotes a microinstruction register (CREG) in which the microinstruction read from the CS 1 is set, numeral 6 denotes a selector (SEL) for selecting the type of the microprogram, numerals 7 and 8 denote gate circuits, numeral 9 denotes an OR gate, numeral 10 denotes a decoder, numeral 11 denotes a zero generation circuit, and numeral 12 denotes a working register (VMIDM) used when the VMID register 101 is referenced by the program. It includes identification information for the VM which is running on the BM 501, that is, an address of a control block for the running VM. Numerals 101-103 denote the VMID register, the index register and the mode indicator, respectively, shown in FIG. 3. The contents thereof are updated by the VMM 502.

In FIG. 7, the microprograms in the CS 1 have addresses 0-7. The microprogram No. 0 executes the instruction of the hardware architecture of the BM 501. The content of the mode indicator 103 is "0" in the non-VM mode and it is also "0" when the VMM 502 operates on the BM 501 even in the VM mode. The content "0" is sent through a decoder 10 and a signal line L1 to forcibly address the microprogram No. 0.

The addressed microprogram in the CS 1 is further addressed by the address register (CSAR) 3 so that instructions are read into the microinstruction register (CREG) 5. A portion of the data held in the microinstruction register 5 is sent out through a signal line L2 as required to modify the content of the address register 3. In a conventional microprogram execution, the content of the address register 3 is incremented by the incrementer 4.

The microinstruction held in the microinstruction register 5 is sent to the ALU 105 through a signal line L3 to drive circuits in the computer system to perform the operations. Specifically, the hardware processing is carried out in accordance with the operation code of the machine instruction as explained in connection with FIG. 3.

When the system operates in the VM operation mode, the content of the mode indicator 103 is "1", which is sent through a signal line L4 of the decoder 10 to open the gate circuit 7 for the 3-bit signal line. The content of the three bits, 29th-31st bits of the VMID register 101 is sent out through a signal line L5 and the OR gate 9 to the selector 6, by which one of the microprograms in the CS 1 is located. Accordingly, the content at the 29th to 31st bits of the VMID register 101 represents the number to locate one of the microprograms in the CS 1. When the content is "0", it means that the VM 504 has the same hardware architecture as that of the BM 501, or the BM mode machine.

When the VM 504 has a different hardware architecture from that of the BM 501, that is, when the content of the 29th to 31st bits of the VMID register 101 is between "1" and "7", the microprogram in the CS 1 corresponding to that number is executed. Thus, by storing the microprograms which are operated in the machine characteristics shown in FIGS. 5 and 6, the hardware operation which is non-homogeneous to that of the BM 501 is attained.

When the VMID register 101 is referenced by the program in the VMM so as to know the place storing the control block in a dispatching process, the zero generation circuit 11 forcibly renders the 29th to 31st bits to "0" and the content thereof is set in the working register (VMIDM) 12, which in turn transfers the content to the program which references it.

Operations to read out one of the microprograms in the CS 1 and store one of the microprograms are now explained.

The read operation is first explained. Assume that the mode indicator 103 has the content "2". The content of the mode indicator 103 is decoded by the decoder 10 so that a signal on a signal line L6 assumes the value "1". The signal on the signal line L6 conditions the gate circuit 8 so that the 3-bits signal from the index register 102 is sent through the gate circuit 8 and the OR gate 9 to the selector (SEL) 6 to control the selector 6, which selects one of the microprogram Nos. 0-7 in the CS 1. The selection number in the CS 1 is stored in the index register 102 by the ALU 105.

The CS address register 3 is then initialized and the microinstruction pointed to by the address register 3 is read out from the CS 1 and set into the microinstruction register 5. Then, it is sent out to the ALU 105 shown in FIG. 3 through the signal line L3. The microinstruction is finally stored at an area in the main storage unit 130 designated by the program.

Thereafter, the content of the address register 3 is sequentially incremented and the above operation is repeated until the execution of the selected microprogram in the CS 1 is completed.

The write operation is next explained. In order to write the microprogram prepared for the hardware processing into the CS 1, the microprogram read from the main storage unit 130 is written into one of the microprograms in the CS 1. The selection of one of the microprograms in the CS 1 is determined by the content of the index register 102 as is done in the read operation. One of the microprograms in the CS 1 is selected and the address register 3 is initialized. The microprogram read from the main storage unit 130 is sent through the line L7 to the CS control circuit 100 through the line L108 and held in the microprogram data register 2. The data is stored at an area pointed to by the address register 3. Then, the content of the address register 3 is incremented by the incrementer 4, and the program data of the microprogram data register 2 is updated by a new data from the main storage unit 130. The accessing method to the main storage unit 130 is the same as that explained in connection with FIG. 3.

In this manner, the microprograms which satisfy various hardware architectures are stored in the microprogram storage areas. Setting of the data to the VMID register 101 is done by a LOAD VMID instruction, referring to the VM identification data by the program is done by a REF VMID instruction, and accessing to the mode indicator 103 is done by a SET MODE instruction. Reading and writing of the instruction of the microprogram from and to the CS 1 are done by a READ CW instruction and a STORE CW instruction, respectively. The LOAD VMID instruction instructs to load the VM identification information from the main storage unit 130 to the VMID register 101, the REF VMID instruction instructs to transfer the content of the VMID register 101 to the accumulator in the ALU 105 through the working register (VMIDM) 12 to send back the content to the program, the SET MODE instruction instructs to set the value to the mode indicator, the READ CW instruction instructs to read the microinstruction and the STORE CW instruction instructs to write the microinstruction. Those instructions can be executed only by the BM 501, that is, in the BM mode on the VMM's operation.

The method of controlling dispatching of the VM by the VMM 502 in the BM 501 shown in FIG. 1 by using the CS control circuit shown in FIG. 7 is now explained.

Figure 8:
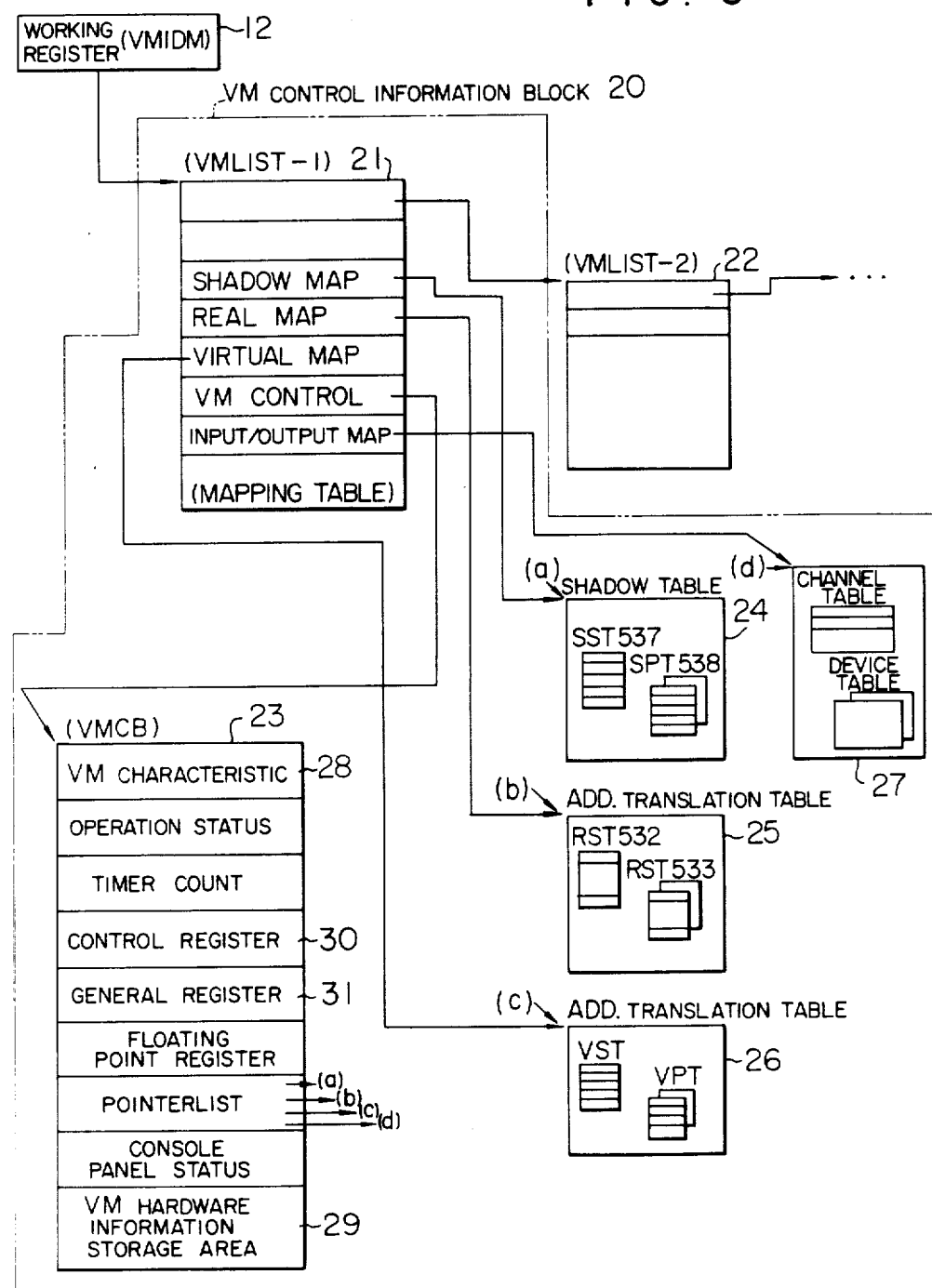
FIG. 8 shows a control information block for managing runs of virtual machines of a virtual machine monitor in accordance with one embodiment of the present invention.

FIG. 8 shows a relation of management information blocks prepared in the main storage unit 130 in order for the VMM 502 to manage the runs of the VM 504 and the VM 505. Numerals 21 and 22 denote control blocks (VMLIST) for managing the runs of VM's. They are prepared one for each of the VM's 504 and 505. Numeral 23 denotes a control block (VMCB) prepared one for each of the VM's 504 and 505 for storing certain VM characteristic and hardware registers, numeral 24 denotes an area for the shadow tables (SST, SPT), numeral 25 denotes an area for the image or address translation tables (RST 532, RPT 533) for managing the second-level storage 531 shown in FIG. 2, numeral 26 denotes an area for the address translation tables (VST 534, VPT 535) for managing the third-level storage 536, and numeral 27 denotes an area for the channel or the device tables (CHTB, DVTB) for the virtual machine versus the bare machine for the input/output devices.

The area 26 is secured when the OS running on the VM 504 uses the virtual storage system and it is prepared in the second level storage 531. The other areas 21-25 and 27 are prepared in the first-level storage 526 shown in FIG. 2.

The control block 21 stores the start addresses for the control blocks for the VM's 504 and 505 and it is a root of information for the VM's. As shown in FIG. 8, the control blocks 21 and 22 are coupled and the control block 21 corresponding to the VM running on the BM 501 is pointed to by the working register (VMID) 12. Since the content of the 29th to 31st bits of the working register 12 is "0", the control blocks 21 and 22 are stored in the 8-byte boundary in the main storage unit 130.

A VM characteristic 28 in the control block 23 contains the type of interface of the VM 504 and the microprogram number of the microprogram being used, selected from the microprograms stored in the CS 1 of FIG. 1. Accordingly, the 0-th to 28th bits of the VMID register 101 contain the address of the control block 21 and the 29th to 31st bits contains the microprogram number being used, derived from the VM characteristic 28 in the control block 23.

The control block 23 contains the hardware information on the VM 504 running on the BM 501, that is, a control register 30 and a general register 31, as shown in FIG. 8. When it is dispatched by the VMM 502, it is transferred to the real hardware resource 520 of the BM 501.

A VM hardware information storage area 29 in the control block 23 is used to store the hardware information of the VM machine when the running VM 504 has a different hardware architecture from that of the BM 501, for example, when the HITAC E-800 or a microcomputer is operated on the HITAC M-Series BM 501. Specifically, the PSW of FIG. 5, the program counter (PC) 131, the accumulator (ACC) 134, the status register 132, the interrupt status register 133 and the hardware registers of the VM 504, shown in FIG. 6 are stored therein. When the machine instruction of the VM is to be executed, this information is transferred from the VMCB 23 through the ALU and the line L115 to the local storage 104 shown in FIG. 3 and processed by the microprogram. A pointer list in the control block 23 of FIG. 8 points to the start addresses of the areas 24-27 of the shadow tables and the address translation table. The blocks included in the VM control information block 20 will be provided for each virtual machine and specified by the VMIDM 12.

Figure 9:
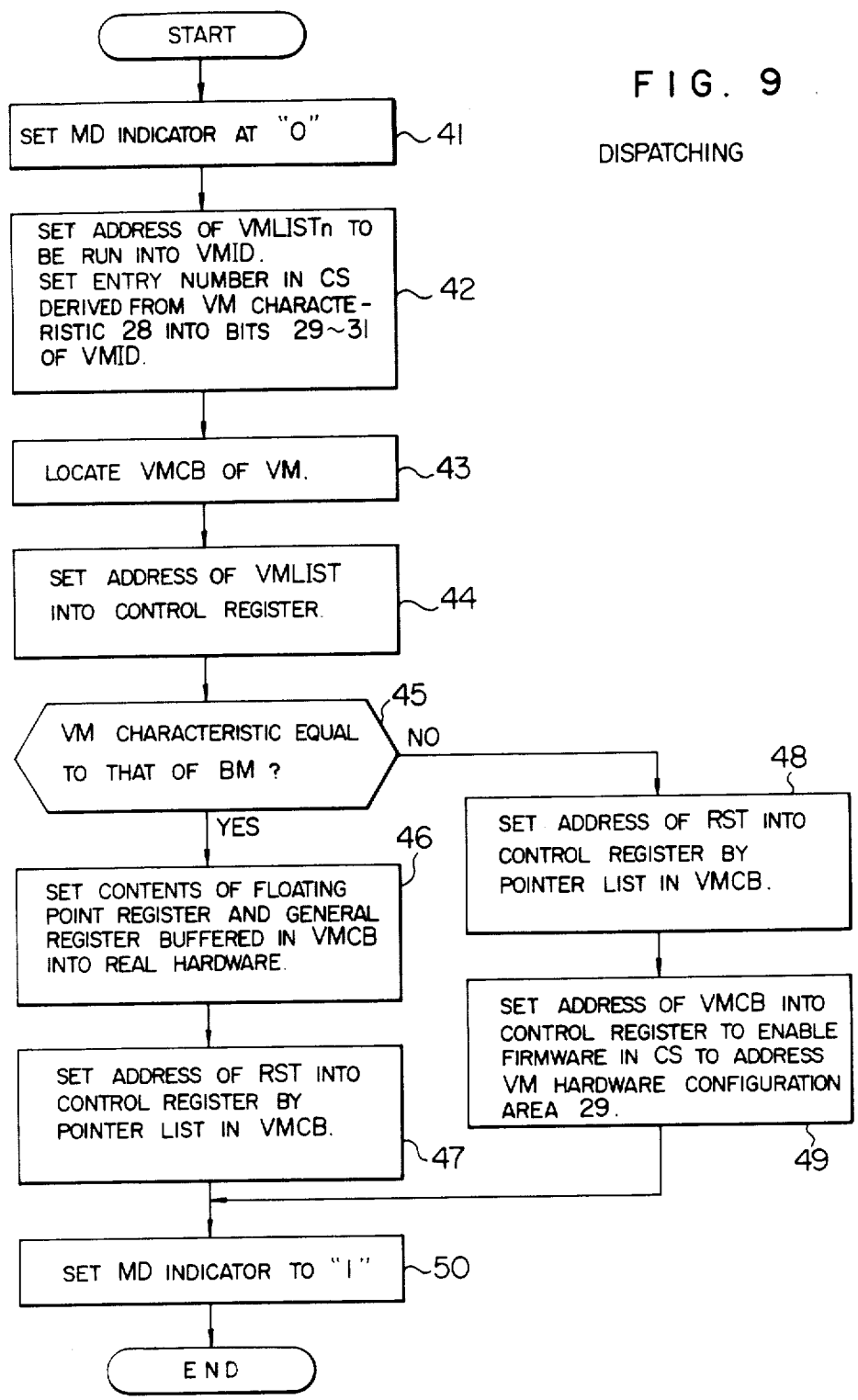
FIG. 9 is a flow chart of dispatching in the virtual machine monitor in accordance with one embodiment of the present invention.

FIG. 9 shows a flow chart for dispatching of the VMM 502. It is now explained with reference to FIGS. 3, 7 and 8.

The content of the mode indicator 103 is first set to "6" so that the microprogram No. 0 in the CS 1 of FIG. 7 is selected (step 41). The operation of the VMM 502 after the step 41 is identical to that for the hardware architecture of the BM 501.

In order to select the VM to be run, the status of the control blocks 21 and 22 is checked and the VM to be run is set in the VMID register 101. The microprogram number of the CS 1 derived from the VM characteristic 28 in the control block 23 is set in the 29th to 31st bits of the working register (VMIDM) 12 (step 42).

Then, the control block 23 shown in FIG. 8 is located through the control block (VMLIST-1) 21 and the address of the control block 21 is set in the control register 521 (steps 43 and 44).

In a step 45, the VM characteristic in the control block 23 is checked, and if the VM 504 has the same hardware architecture as the BM 501, steps 46 and 47 are carried out, and if the VM 504 has a different hardware architecture than the BM 501, steps 48 and 49 are carried out.

In the step 46, the hardware information stored in the control block 23 is transferred to th=hardware resource 520 of the BM 501, and in the step 47, the address of the address translation table is set to the control register 521 to allocate a virtualized main storage area to the VM 504 to be run.

The steps 48 and 49 are carried out when the hardware architecture of the running VM 504 is different from that of the BM 501. The step 48 is identical to the step 47 because the virtualizing method of the main storage unit 130 is allocated to the VM 504 to be run, that is, the space-division method of the main storage unit 130 is identical to the method for allocating to the machine having the same hardware architecture as the BM 501. Accordingly, the step 47 and the step 48 may be merged and carried out before the step 45.

In the step 49, the hardware information storage area 29 of the control block 23 is located so that the microprogram executes the instruction under the hardware architecture of the VM 504, and the executing microprogram transfers the hardware information to the local storage 104 and processes it. While not shown, the hardware information transferred to the local storage 104 is present in the local storage 104 while the VM 504 is running, but is returned to the control block 23 when the operation in the BM 501 shifts to the VM 505 or the VMM 502.

Finally, the content of the mode indicator 103 is changed to "1" to terminate the dispatching.

As the above process terminates, the CS control circuit shown in FIG. 7 operates to select the microprogram corresponding to the hardware architecture of the VM.

The CS 1 of FIG. 1 can store up to eight microprograms No. 0–No. 7. This does not mean that only eight VM's can run but the number of VM's which can run is not limited because the microprograms may be shared by the VM's.

As the VMM 502 carries out the dispatching, the VM's 504 and 505 can run effectively. When the machine having the different hardware architecture than that of the BM 501 is to be run, the microprogram corresponding to that machine is selected and the hardware information is transferred to the local storage 104. In FIG. 6, the microcomputer operates under the BM 501. In the microcomputer, the program counter (PC) 131 corresponds to the prior art next instruction address (NIA) 135 and the instruction pointed to by the program counter 131 is read out from the main storage unit 130. The accessing method to the main storage unit 130 is identical to that explained in FIG. 3.

The execution of the instruction of the microcomputer follows the concept of the accumulator. It includes addition and subtraction of the content of the accumulator and the value read from the main storage unit, and addition and subtraction of the content of the accumulator and the content of the register. For those operations, the accumulator (ACC) 134 and the status register 132 are set as shown in FIG. 6. The area of the accumulator 134 is set in the local storage 104, the content of this area and the content of the main storage unit 130 are operated, and the operation result (e.g. overflow or carry) is set in the status register 132.

What is claimed is:

1. A virtual machine system for executing plural operating-system programs, each on one of a plurality of virtual machines, using a bare machine, under control of an operating-system program for the virtual machine system, at least a first one of the operating-system programs comprising instructions belonging to an instruction set capable of use with the bare machine and at least a second one of the operating-system programs comprising instructions not belonging to said instruction set, comprising:

(a) a main storage; and
(b) an execution unit including:
virtual machine identification means for holding identification information for identifying the virtual machine running on said bare machine;
operation means for performing an arithmetic or logical operation on data input thereto;
a plurality of registers connected to said operation means each for holding an operand data signal to be provided to said operation means or received from said operation means or for holding control data required for execution of instructions;
a local storage connected to said operation means for holding a data signal to be provided to said operation means or received from said operation means and for holding control data required for execution of instructions to provide a resource having a different hardware architecture than that of the bare machine;
control storage means connected to said operation means, said registers and said local storage means for holding microinstructions to control execution of instructions held by said main storage, said microinstructions including a first group of microinstructions for controlling execution of instructions for said first operating-system program, so that operations designated by the instructions of the first operating-system program are executed by said operation means and said registers, a second group of microinstructions for controlling execution of instructions for the second operating-system program, so that operations designated by the instructions of the second operating-system program are executed by said operation means and said local storage and a third group of microinstructions for controlling transfer of control data and operand data signals between said main storage and said local storage;
index means connected to said control storage means for enabling said control storage means to select one group of the first and second groups of microinstructions depending upon whether an operating system under execution is said first or second operating-system program; and
a plurality of table means provided in said main storage, connected to said execution unit and each provided for one of the virtual machines, for receiving control data and operand data signals saved from said execution unit when a corresponding virtual machine is suspended from execution by said operating-system program for the virtual machine system and for providing the control data and the operand data signals to said execution unit to restore data therein when the corresponding virtual machine is put into execution again by said operating system program for the virtual machine system, wherein a first one of said table means is provided for a first virtual machine which executes the first operating-system program, receives control data and operand data signals held by said registers and provides the control data and the data signals thereto, and a second one of the table means is provided for a second virtual machine which executes the second operating-system program, receives control data and operand data signals held by said local storage and provides the control data and operand data signals thereto, wherein said operating-system program for the virtual machine system includes first instructions for transferring control data and operand data signals between said registers and first table means, which first instructions are executed when the first operating-system program is put into execution or suspended from execution, and wherein said operating-system program for the virtual machine system includes second instructions for transferring a main storage address of said second table between a control register within said registers and the main storage and for starting the third group of microinstructions so that control data and operand data signals are transferred between said local storage means and said second table means in response to the address, which second instructions are executed when the second operating system is put into execution or suspended from execution.

* * * * *